United States Patent
Ramskov

(10) Patent No.: US 12,516,532 B2
(45) Date of Patent: Jan. 6, 2026

(54) CORNER ASSEMBLY, A STRUCTURAL FRAME COMPRISING SAID CORNER ASSEMBLY, AND THE USE OF THE CORNER ASSEMBLY

(71) Applicant: Lasse Ramskov Holding APS, Hvidovre (DK)

(72) Inventor: Lasse Fomgsgaard Ramskov, Holte (DK)

(73) Assignee: Lasse Ramskov Holding APS, Hvidovre (DK)

( * ) Notice: Subject to any disclaimer, the term of this patent is extended or adjusted under 35 U.S.C. 154(b) by 846 days.

(21) Appl. No.: 17/787,118

(22) PCT Filed: Dec. 16, 2020

(86) PCT No.: PCT/EP2020/086374
§ 371 (c)(1),
(2) Date: Jun. 17, 2022

(87) PCT Pub. No.: WO2021/122711
PCT Pub. Date: Jun. 24, 2021

(65) Prior Publication Data
US 2023/0051257 A1    Feb. 16, 2023

(30) Foreign Application Priority Data
Dec. 17, 2019    (DK) .............................. PA201970780

(51) Int. Cl.
*E04G 21/24* (2006.01)
*E04G 21/28* (2006.01)
(Continued)

(52) U.S. Cl.
CPC ......... *E04G 21/241* (2013.01); *E04G 21/243* (2013.01); *E04G 21/28* (2013.01);
(Continued)

(58) Field of Classification Search
CPC ......... E06B 3/9685; E06B 3/9684; E06B 3/96
See application file for complete search history.

(56) References Cited

U.S. PATENT DOCUMENTS

| 2,947,391 | A | 8/1960 | Wayne |
| 4,825,529 | A | 5/1989 | Sawada et al. |
| 7,389,564 | B2 * | 6/2008 | Lautenschlager ..... E06B 3/9725 403/255 |

FOREIGN PATENT DOCUMENTS

| DE | 20204618 U1 | 7/2003 | |
| EP | 3575539 A1 * | 12/2019 | ........... E06B 3/9641 |

(Continued)

OTHER PUBLICATIONS

International Preliminary Report on Patentability for International Patent Application No. PCT/EP2020/086374, completed Mar. 25, 2022, 6 pages.

(Continued)

*Primary Examiner* — Adriana Figueroa
(74) *Attorney, Agent, or Firm* — Fox Rothschild LLP

(57) ABSTRACT

The present invention relates a corner assembly for use in a structural frame, said corner assembly comprises a housing defining a first and a second groove arranged at a predetermined angle to each other, and wherein the first groove is arranged for telescopically receiving and/or displacing a first elongated structural element and the second groove is arranged for telescopically receiving and/or displacing a second elongated structural element, and wherein the corner assembly further comprises a first and a second locking mechanisms arranged for independently of each other releasably fastening the first and second elongated structural element in the corresponding first and second groove. Since both the first and second locking mechanism is arranged for individually securing/fastening an elongated structural element to the corner assembly, the telescopic extension/displacement of each elongated structural element can be individually and independently adjusted irrespectively of the extension/displacement of the other elongated structural element.

24 Claims, 10 Drawing Sheets

(51) Int. Cl.
*E06B 3/54* (2006.01)
*E06B 3/72* (2006.01)
*E06B 3/964* (2006.01)
*E06B 3/968* (2006.01)
*F16B 12/44* (2006.01)

(52) U.S. Cl.
CPC .............. *E06B 3/5454* (2013.01); *E06B 3/72* (2013.01); *E06B 3/9641* (2013.01); *E06B 3/9685* (2013.01); *F16B 12/44* (2013.01)

(56) References Cited

FOREIGN PATENT DOCUMENTS

| | | | | | |
|---|---|---|---|---|---|
| FR | 1365809 | A | * | 7/1964 | |
| GB | 191004146 | A | * | 11/1910 | |
| JP | 2007-117406 | A | | 5/2007 | |
| NL | 7800399 | A | * | 7/1978 | ............... E06B 9/52 |

OTHER PUBLICATIONS

International Search Report and Written Opinion for International Patent Application No. PCT/EP2020/086374, mailed Mar. 18, 2021, 9 pages.

\* cited by examiner

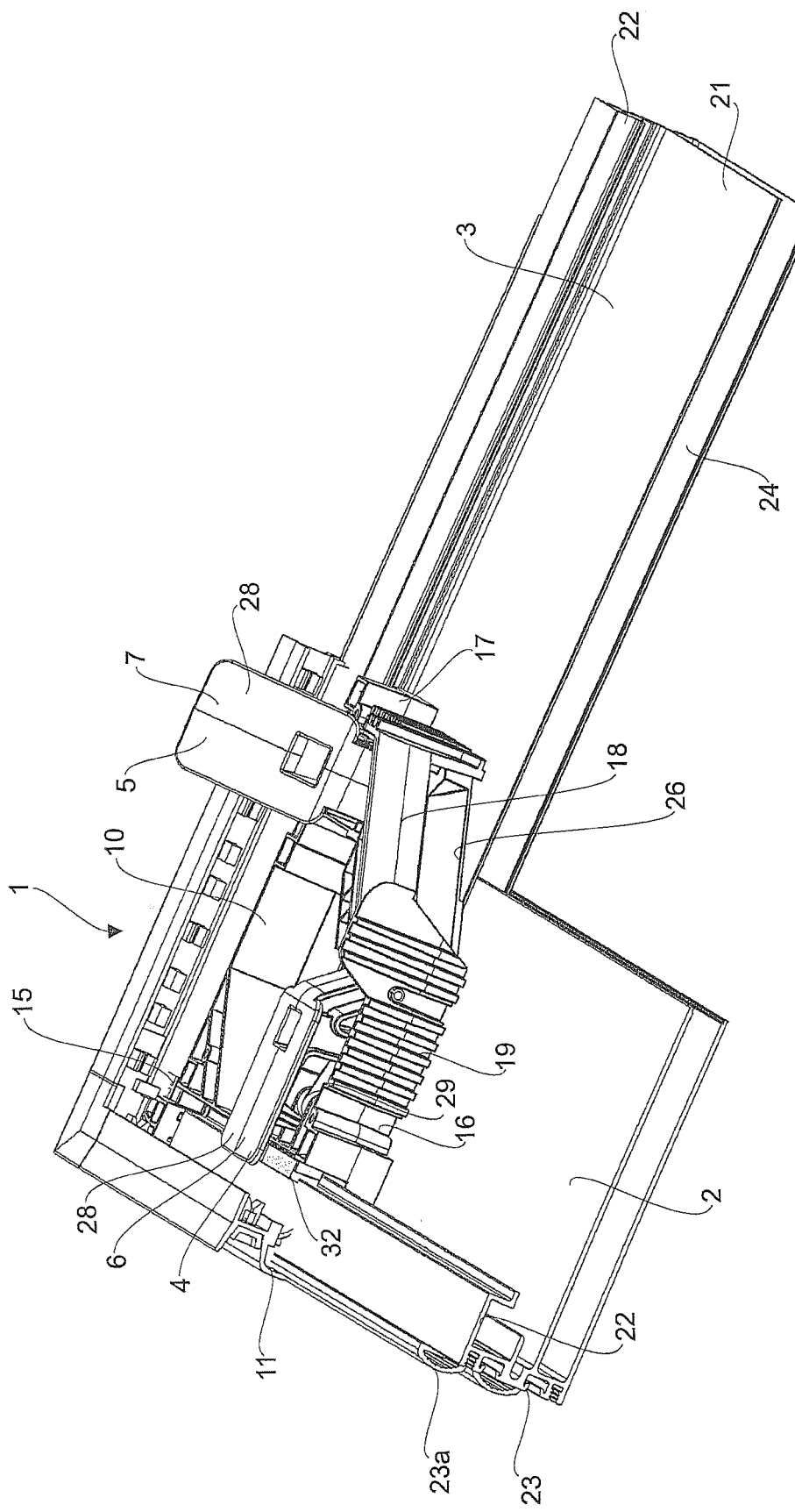

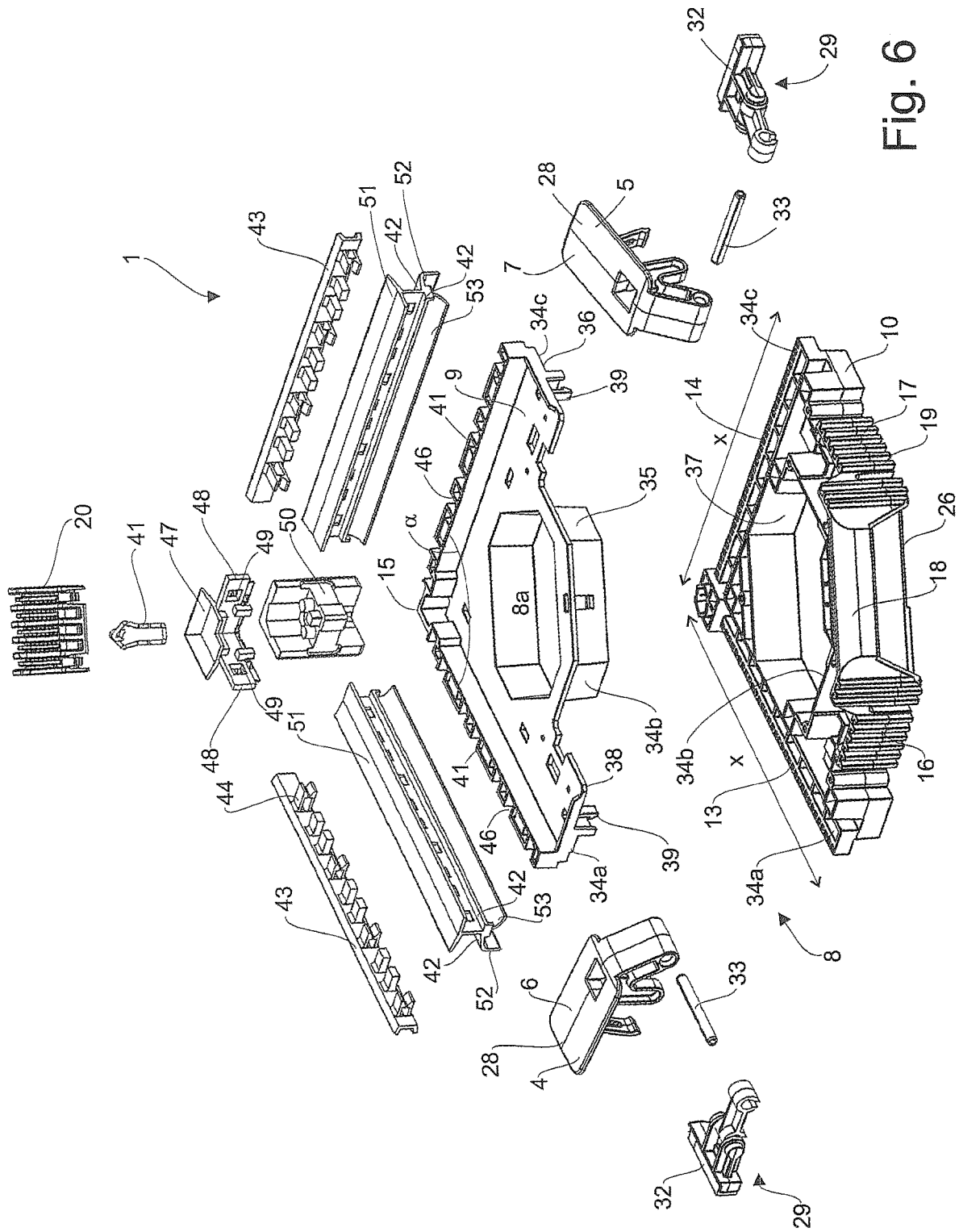

CORNER ASSEMBLY, A STRUCTURAL FRAME COMPRISING SAID CORNER ASSEMBLY, AND THE USE OF THE CORNER ASSEMBLY

CROSS REFERENCE TO RELATED APPLICATIONS

This application is a 371 filing of International Patent Application PCT/EP2020/086374 filed Dec. 16, 2020, which claims the benefit of Danish patent application no. PA 2019 70780 filed Dec. 17, 2019, the disclosures of which are hereby incorporated by reference herein.

TECHNICAL FIELD

The present invention relates to a corner assembly, structural frame comprising said corner assembly, and the use of the corner assembly for adjusting the structural frame.

BACKGROUND

Structural frames are used in a wide variety of constructional elements spanning from furniture, to building components, and are typically constructed by connecting horizontal and vertical elongated elements by corner pieces, joints or bondings.

One place where structural frames increasingly are used in the industry, are as safety rails, partitions, and interim windows and doors at construction sites. Using interim window/doors during construction and/or renovation of a building will not only ensure that the building is insulated during the construction/renovation period, but also that snow and/or rain effectively are prevented from entering the building, thereby protecting tools and/or materials from damages.

Conventionally the interim windows/doors have been constructed as simple structures in the form of a wood frame with a sheet of plastic spanning the opening in said frame. However, such interim closures, even though they have a simple structure, expensive to manufacture, are often relatively as the structural openings, which the interim closures are intended to seal off, often have different dimensions whereby each interim window and/or door must be individually constructed on site. Furthermore, such interim windows or doors will not prevent unauthorized persons from entering the building, as said persons quickly can cut an opening in the plastic sheet, nor will they provide the desired insulation in cold or warm weather.

These problems have been remedied by the temporary closure disclosed in WO2005031087. Said document discloses a temporary closure in which a quadrangular frame is spanned by a solid pane of e.g. glass, thereby both providing a higher degree of isolation, as well as effectively preventing unauthorized personal from gaining access to the building. The frame comprises four corners having pipes which telescopically can be connected to pipes on four side member whereby the dimensions of the quadrangular frame can be changed, e.g. in dependence of different structural openings. The temporary closure of WO2005031087 remedies most of the disadvantages of the conventional interim closures, however since the pipes of the side members and corners are only secured to each other when the pane is fastened to a corner plate, it may be difficult and time-consuming to assemble and/or adjust the frame, and the components may become loose over time when subjected to vibration and/or the environment, compromising the alignment of the frame. The frame and corners are furthermore manufactured in steel, making the construction heavy and expensive.

SUMMARY

It is therefore a first aspect of the present invention to provide a corner assembly having components of a simple and relatively inexpensive character, which easily and economically can be mass-produced and readily used by anyone without requiring skill or training, it is a second aspect of the preset invention to provide a corner assembly fastening arranged for two elongated structural elements to said corner assembly using a locking mechanism which can be operated without the use of tools, it is a third aspect of the present invention to provide a corner assembly which is arranged for fastening two elongated structural elements to said corner assembly at a predetermined angle, It is a fourth aspect of the present invention to provide a structural frame comprising at least one corner assembly, and wherein said frame easily can be customized and altered in relation to a new surroundings or openings to be closed by the structural frame.

It is a fifth aspect of the present invention to provide an interim closure, a partition or part of a partition, and/or a safety rail, using the structural frame according to the invention.

These and further aspects are achieved according to the present invention by providing a corner assembly for use in a structural frame, said corner assembly comprises a housing defining a first and a second groove arranged at a predetermined angle to each other, and wherein the first groove is arranged for telescopically receiving and/or displacing a first elongated structural element, and the second groove is arranged for telescopically receiving and/or displacing a second elongated structural element, and wherein the corner assembly further comprises a first and a second locking mechanisms arranged for independently of each other releasably fastening the first and second elongated structural element in the corresponding first and second groove.

The corner assembly according to the invention can be used in a large number of different constructions and/or structures, however in a preferred embodiment the corner assembly is used for providing a structural frame, wherein the corners of the frame are formed by one or more corner assemblies according to the invention, and the sides of the frame are formed by a number of elongated structural elements fastened to said corner assembly, e.g. such that one elongated structural element is connected to two corner assemblies, one at each end of the elongated structural element, until a structural frame is provided. Such a structural frame may be an interim closure, e.g. an interim door or an interim window, a partition or part of a partition for preventing dust from spreading during renovation work, a safety rail, and/or any other relevant construction in which it may be desired to be able to adjust the dimensions of the structural frame. It is in this respect preferred that the structural frame is a substantially flat construction and/or that said structural frame in a position of use is oriented in a substantially vertical position, i.e. the structural frame is a vertical structural frame, thereby e.g. allowing the structural frame to be used as an interim window, a partition or part of a partition for preventing dust from spreading during renovation work, a safety rail etc.

The first and second locking mechanism is arranged for individually securing/fastening an elongated structural element to the corner assembly, and it is preferred that said locking mechanism are arranged/configured such that the telescopic extension/displacement of each elongated structural element can be individually and independently adjusted irrespectively of the extension/displacement of the other elongated structural element. In this way the corner assembly according to the invention provides a very large degree of freedom and flexibility, since the height of a provided structural frame can be adjusted independently of the width of said frame, and vice versa. Furthermore, the stability of the structural frame is maintained during an adjustment of the dimensions, since it is possible to operate one of the locking mechanisms, and adjusting the corresponding elongated structural element, while the other locking mechanism remains in a locked position.

It is preferred that the first and second locking mechanism each is arranged for locking the elongated structural element at a desired position in their respective longitudinal groove, i.e. the locking mechanism is not arranged for locking the elongated structural element in only one or more predetermined position(s).

This is advantageously, since a structural frames constructed using one or more corner assemblies according to the invention can be assembled at one location, and then easily and individually adjusted to the desired dimensions/size on site e.g. in order to match structural openings of different dimensions and tolerances. For instance, during construction of a building, the provided window openings will normally have different sizes and it has conventionally been both time-consuming and difficult to provide the desired closure/insulation of such openings. However, by using a structural frame comprising one or more corner assemblies according to the invention, it has proven to be very easy to adjust the height and/or width of the frame by simply adjusting the telescopic displacement of the respective elongated elements in each their groove, and via the individual locking mechanism fasten/secure them at the desired extension/displacement to the corner assemble, thereby maintaining the integrity/stability of the structural frame during the adjustment. It is thereby possible to provide a structural frame which matches/fits a large number of different structural openings, even though there may be variations between the respective openings. Furthermore, when e.g. a window opening later is closed by a permanent window, the interim window can easily be adjusted to fit a different opening with a different size. The structural frame can accordingly be used several times, at both the same construction site and at different construction sites.

Within the context of the present invention the term "structural frame" is a substantially rigid structure that surrounds an object such as a door, a windowpane, a wood plate, a net, etc. The shape of the structural frame can be any desired shape, and said term is accordingly not restricted to frames having four right angles, e.g. an equilateral square or a rectangle. A structural frame can within the context of the present invention equally well have other shapes, such as other quadrilateral shapes e.g. a trapezoid shape, or alternatively a triangular, a pentagonal, or a hexagonal shape.

The first and second locking mechanism may be any desired mechanism arranged for fastening the elongated structural element at desired position in the corresponding groove. It is however preferred that said locking mechanism does not require any tools for being operated, and/or that that said locking mechanism is not a bolt/nut, screw or similar device comprising a thread, or operated using such a device.

In a preferred embodiment the first and second locking mechanism for fastening the elongated structural element to the corner assembly may each comprises a first toggle clamp assembly comprising a toggle handle for actuating a toggle mechanism between a clamped position, where the elongated structural element is secured and/or fixed to the corner assembly by frictional force, and a released position where the elongated structural element can be displaced in the respective groove of the housing.

The toggle handle is preferably arranged for pivoting between the clamped and the released position about a pivot axis, such that the user only has to lift and or press on the toggle handle in order to shift between the clamped and the released position. This will not only allow the toggle clamp assembly to be operated without the need of any tools, but also that any construction e.g. a structural frame using one or more corner assemblies according to the invention, easily can be assembled, and/or adjusted, while maintaining the stability of the frame, and also be easily dismantled, if desired.

The toggle clamp assembly may in a second toggle clamp assembly comprise an elongated toggle handle in the form of a pin, and a hinge assembly comprising two guide plates, and wherein said pin at one end comprises an abutment surface for engaging the elongated structural element. The guide plates are at one end connected to a middle section of the elongated toggle handle, and at the other end to each their mounting unit that is connected/attached to the housing. The length of the guide plates will limit the relative pivotal movement of the elongated toggle handle between the released and clamped position, and the length is accordingly determined in order to provide a sufficient gap between the elongated structural element when the toggle clamp assembly is in a released position allowing the elongated structural element to be displaced in the corresponding groove. The pivotal movement may furthermore be guided/restricted by two sliding pins placed near the distal end of the elongated toggle handle each being arranged for engaging a sliding opening in respective sliding blocks that are fastened to the housing.

The first and second locking mechanism for the corner assembly of the present invention may in a further embodiment be in the form of a swing clamp comprising a swing arm connected to a circular abutment unit made of resilient, slightly deformable material. The swing arm may rotate about 90 degrees about a rotating axis, preferably placed in or near the centre of the circular abutment unit. The swing clamp and rotation axis is designed such that when the locking mechanism is in the released position a small gap between the elongated structural element and the circular abutment unit is provided, thereby allowing the elongated structural element to be displaced in the corresponding groove, and when the locking mechanism is placed in a clamped position a firm grip with the elongated structural element is provided.

In a further embodiment the first and second locking mechanism are formed as an L-shaped pin comprising a first leg with an abutment surface for engaging the elongated structural element, and second leg that is functioning as a handle. The first leg is connected to the housing via at least one connection unit which has sufficient clearance for allowing the L-shaped pin to both rotate about the first leg's longitudinal axis, and move along said longitudinal axis. This will in a simple manner both guide and allow the L-shaped pin to swing/pivot between the released and activated position.

When the L-shaped pin is in the released position said pin is placed in a plane parallel with the housing, and the second leg of the L-shaped pin is preferably placed between two parallel locking plates in order to prevent any unintentional movement of the L-shaped pin e.g. during transport. When the L-shaped pin is to be placed in the activated position, the used simply swings the L-shaped pin out of the plane parallel with the housing, move the first leg towards the elongated structural element, in order to abut said element, and continue the swinging movement until the L-shaped pin again is placed in a plane parallel with the first corner module. If desired the L-shaped pin can be secured to the housing when placed in the clamped position, e.g. by abutting the second leg against a first abutment surface of the first connection unit, thereby preventing any unintentional movements of the pin.

Since the first and second locking mechanism is arranged such that it can be operated without the need of any tools, the user can simply move the handle between the clamped and released positions. This also ensures that any construction e.g. a structural frame using one or more corner assemblies according to the invention, easily can be assembled, and/or adjusted, while maintaining the stability of the frame, and also be easily dismantled, if desired.

In order to ensure that the first and second locking mechanism, e.g. the first toggle clamp assembly can fixate the elongated structural element only by means of frictional force, the first and second locking mechanism preferable comprises an abutment surface which resiliently is pressed against at least a part of the elongated structural element when the first and second locking mechanism e.g. the first toggle clamp is placed in it's actuated clamped position. Said abutment surface may have any shape/dimension, the only requirement being is that the elongated structural element must be fixated by means of frictional force. Said abutment surface may e.g. comprise one or more points, be in the form of one or more circle(s), triangle(s) etc., it is however preferred that for the first toggle clamp assembly said abutment surface is substantially elongated, e.g. a plate that is part of an elongated block.

The first and second locking mechanism is preferably arranged for transferring a predetermined tension load to the elongated structural element. When the first and second locking mechanism is in the form of the first toggle clamp assembly said tension load is preferably transferred via a suitable toggle clamp mechanism, e.g. a toggle knee and toggle bumper, to said abutment surface.

The first and second locking mechanism is in a preferred embodiment designed such that the predetermined tension load applied to the elongated structural element is higher than the external forces acting on the elongated structural element, thereby effectively preventing the elongated structural element from separating from the abutment surface, e.g. sliding out of or rotating in the groove. The required predetermined tension load is therefore determined by e.g. the dimensions of the elongated structural element. It should be noted that rotational movement of the elongated structural element relative to the housing of the corner assembly substantially is prevented since the elongated structural element is placed in the groove, which will aid in maintaining the orientation of said element. A person skilled in the art will therefore easily be able to determine the necessary predetermined tension load for maintaining the elongated structural element securely in place.

In order to providing a firm and secure connection between the abutment surface and the elongated structural element, the abutment surface is preferably made of, or comprises an outer layer of, a resilient materiel arranged for increasing the friction coefficient and/or the surface area contact between the respective abutment surface and the elongated structural element, thereby providing an improved surface grip and larger friction contact. An increased friction coefficient may also be obtained by using a deformable material, applying a coating arranged for increasing the friction, e.g. a foam coating which will deform during use; providing patterns and/or deformations in either the abutment surface and/or the elongated structural element, and/or any other relevant alterations which will increase the surface area and/or increase the contact friction between the abutment surface and the elongated structural element. In this way an improved and stable corner assembly according to the invention is provided, wherein fixation of the elongated structural element in the groove is achieved only by frictional force and not by use of e.g. screws/bolts etc.

The first and second locking mechanism e.g. the first toggle clamp assembly may comprise a latch assembly or a locking hook arranged for locking the locking mechanism in a clamped position to prevent unintentional movement of the locking mechanism when the locking mechanism is in a closed, clamped position. For the first toggle clamp assembly the latch assembly may in one embodiment comprise a pivotal lever member which engages complementary notches located on the housing, or be in the form of a strap or elastic/resilient band which is arranged for spanning the toggle handle and for being secured to the housing. The looking hook may be arranged for releasably engaging a recess in the housing, and wherein said hook is arranged for being disengaged from said recess if pressure is applied to the toggle handle when the toggle clamp is moved to the released position.

The corner assembly according to the invention can be used as one or more of the corners of the structural frame, e.g. one, two, three etc. However, it is preferred that the corner assembly is used at all corners of the frame as this provides the highest degree of flexibility for adjusting the structural frames dimensions during use. If only some of the corners of a frame are constituted by the corner assembly according to the invention, the remaining corners can be assembled in any conventional way, e.g. after the corner assemblies according to the invention has been connected to the relevant elongated structures.

The corner assembly according to the invention can also be used in only a part of a structural frame, e.g. if it is desired to connect two elongated situational elements at a mutual predetermined angle.

The corner assembly is arranged for fastening the two elongated structural elements to said corner assembly at a predetermined angle. Said predetermined angle is defined by the angle between the two grooves of the housing, such that when the elongated structural elements are placed in said grooves they will automatically be placed at the predetermined angle relative to each other. The predetermined angle preferably corresponds/matches an outer angle of the housing which is provided by two outer linear edges/sides of said housing or the corner assembly, which also has the advantage that the predetermined angle visually can be determined simply by looking at the corner assembly. A structural frame, or part of the frame, will thereby have an outer angle corresponding to the predetermined angle of the respective corner assembly.

Within the context of the present invention the terms "outer angle" and "outer side" means the angle(s) and side(s) which forms a part of the outer side of a structural frame comprising at least one corner assembly according to the invention.

In a preferred embodiment the predetermined angle is a right angle i.e. 90 degrees, as such a corner assembly is simple and easy to use. For instance, if four corner assemblies, each having a predetermined right angle are connected via four elongated structural elements, an equilateral square or rectangle frame is provided. Said frame can be used in or as a large number of different structural components e.g. as an interim window or a interim door arranged for sealing a building during construction or renovation, or as an interim wall/partition arranged for preventing dust from spreading during construction and/or renovation work, as a safety rail, and the like.

Even though a corner assembly with a right angle may be preferred, the predetermined angle may be any relevant angle, including an acute angle or a blunt angle. As an example can be mentioned that a corner assembly with a blunt angle of 108 degrees is advantageously if it is desired to provide a frame in the form of a pentagon, and a structural frame made with corner assemblies each having a blunt angle of 120 degrees will have the shape of a hexagon. Other blunt angles may be relevant if the corner assembly is used for providing only part of a frame, e.g. if the corner assembly is used for connecting two elongated structural elements at a blunt angle and wherein the provided construction is used as a roof joist, a scaffold etc. In a similar manner a corner assembly with an acute angle of 60 degrees can be used for providing an isosceles triangular frame. Combinations of corner assemblies having different predetermined angles, e.g. blunt, acute and right angles, may be used for providing structural frames, or part of frames, with other relevant shapes, e.g. in the form of a trapezoid.

The extend to which the elongated structural element can be telescopically displaced in the groove of the corner assembly may be determined by the length of the groove. It is accordingly preferred that the corner assembly has a size and/or dimension which matches the intended use and desired flexibility. For instance, a corner assembly intended for use as an interim window may require a larger flexibility, and accordingly longer grooves (larger housing) than a corner assembly for use in a structural frame to be used as a partition between rooms, or vice versa. Furthermore, even though it is preferred to provide a corner assembly in which the two grooves have substantially identical lengths/dimensions, the length of the two grooves may in another embodiment be different e.g. if it is desired to provide a larger degree of displacement for one of the elongated structural elements than the other. Each groove may in a preferred embodiment have a length between 5 cm and 30 cm, preferably between 10 and 20 cm, e.g. about 15 cm, however said length may be smaller or larger if desired.

In a preferred embodiment the first and second locking mechanism, e.g. the first toggle clamp assembly is secured within the housing of the corner assembly, such that the toggle handle extends above the housing for easy manipulation and activation, and the remaining part of the locking mechanism e.g. the toggle mechanism of the toggle clamp, is protected inside the housing, thereby providing a simple construction with a high integrity.

The housing may in one embodiment be provided as an integral structure, it is however preferred that the housing of the corner assembly comprises a first and a second corner module arranged for being releasably interconnected to each other thereby providing an easy way of placing e.g. the toggle mechanism inside the housing during assembling.

When the first and the second corner module are connected they will define the first and second groove for telescopically receiving the elongated structural element. Said first and second grooves are accordingly determined/defined by the shape and size of the housing and/or corner modules.

It is in this respect preferred that the obtained groove have a shape which is complementary to a guide profile of the elongated structural element, i.e. the part of the elongated structural element arranged for being placed in said groove. It is further preferred that the groove and guide profile are arranged such that the elongated structural element not only is guided during the telescopic displacement in the groove, but also such that the elongated structural element only can be inserted in the groove in one way, thereby aiding in providing corner assembly which is easy and simple to use.

In a preferred embodiment the cross sectional shape of the first and second groove, perpendicular to their respective lengths is preferably an L-shape, a zigzag shape, and/or comprises a number of successive legs, e.g. three or four arranged at an angle relative to each other such that a suitable guiding system is provided. It is further preferred that the successive legs of the respective grooves are arranged at an angle of about 90 degrees to each other, as this will provide a guide system, i.e. groove and guide profile, which is both easy to manufacture and to use. In order for the guide profile to slide easily in the groove, but at the same time prevent any backlash/slack it is preferred that only a small gap/tolerance is provided between the groove and the guide profile. Said gap is preferably as small as possible, but the inventors of the present invention has found that by using a gap of between 0.1 mm and 0.5 mm, optimal guiding properties are obtained, while preventing any slack during use.

In a preferred embodiment the first and second corner module of the housing is arranged for quick and easy connection with each other, and said modules may accordingly comprise complementary mating surfaces which fit together to form the overall housing. Said mating surfaces may be disposed on one or more opposite outer side(s)/edge(s) of the first and second module, and/or on one or more opposite interior surface of said modules. It is preferred that the mating surfaces have a shape and geometry configured to exactly match, or at least substantially match, with each other, not only in order for providing a simple and reliable way of assembling the housing, but also in order to disperse forces evenly throughout the housing during use of one or both of the locking mechanisms. The mating surfaces preferably have the advantage that during assembling of the housing the first module will be guided towards the second module by the geometry of their mutual mating surfaces, such that the housing only can be assembled in one way.

The amount of mating surface area that is in contact after assembling can easily be adjusted by adding more or fewer mating surfaces in order to obtain optimal integrity and stability of the housing and accordingly the corner assembly. The mating surfaces may be provided by any suitable means e.g. in the form of a rigid structural network and/or recesses and projections, provided on the first and/or second module.

In order to ensure that the first and second corner modules stays firmly connected after assembly, the two modules may in addition comprise a number of snap fits, and/or other complementary structural fastening mechanisms that effectively interlocks the modules together and/or prevents said modules from being displaced relative to each other e.g. during use.

Said fastening mechanisms may be any suitable conventional fastening mechanism arranged for releasably interconnecting the first and second corner module, e.g. an integral snap fit system, thereby ensuring that manufacture and assembly of the housing is relatively simple and economical. One example of a suitable snap-fit system comprises one or more integral fastening pins placed on one or more of the mating surfaces of the first and/or second module, and one or more complementary slot(s) for receiving the fastening pins arranged on the opposite mating surfaces of the first and/or second module, respectively.

The fastening pin may preferably comprises one or more barbs, arranged for retaining the fastening pin in the fastening positions when the fastening pin is inserted in the slot, thereby firmly and securely connecting the first and second corner modules. The end of the fastening pin may be angled to allow the barb to be disengaged from the slot if pressure is applied to said end, allowing the first and second corner module to be disconnected if desired.

Within the context of the present invention the fastening pin(s) may be integrally arranged on one or both of the corner modules, the only requirement being that the fastening pin engages a slot on the opposite module in order for the two modules to interconnect. Using such a snap-fit system ensures that the housing of the corner assembly can be connected in a simple and reliable manner, without tools.

If considered necessary e.g. if the corner assembly are used in extreme conditions or large forces are placed on said assembly, the housings can also be arranged for being connected by screws or similar mechanical fastening means, in order to further aid in the attachment procedure.

The corner assembly may have any suitable shape, and may e.g. be in the form of a square, a triangle etc, it is however preferred that the assembly is substantially flat having at least two outer sides which during assembling defines the grooves, and which meets in the predetermine angle.

The corner assembly according to the invention may in a preferred embodiment further comprise one or more gaskets and/or seals arranged at least on one outer side/edge of the first module, preferably both outer side/edges, such that when a structural frame comprising at least one corner assembly according to the invention, is inserted into an opening in e.g. a wall, a substantially air and/or liquid tight seal will be provided between the wall and the structural frame. In a similar way the elongated structural element may comprise an outer gasket for providing a seal with an opening.

The gasket(s) can be made of any suitable material, e.g. EPDM (Ethylene Propylene Diene Monomer) rubber; silicone rubber, which is both flexible and resistant to high temperatures; natural rubber, and other suitable elastomer materials.

The gasket of the corner assembly can be attached to one or both of the outer edges of the first module in any conventional manner, e.g. by adhesion, but in a preferred embodiment the gasket is releasable attach to said edge(s) by means of a mounting profile. In order to aid in the assembling of the corner assembly according to the invention, one or both of the outer edges of the first module, may comprise a number of openings, and wherein the gasket(s) comprises a number of overlapping openings. The outer edge and the gasket may further comprise a complementary 3D-pattern, allowing the gasket and edge to be combined and aligned. The mounting profile may then comprise a number of projections e.g. comprising snap locks, arranged for extending through the openings of the gasket and interlocking with the openings in the edge of the first module, e.g. using a dovetail or similar system, thereby releasable attaching the gasket to the edge. If desired, other gaskets may be placed in other sections of the corner assembly, e.g. as a corner gasket, in order for effectively combining the gaskets placed at the two side edges of the corner assembly, etc.

The corner assembly according to the invention may in addition to the first and second groove, comprise one or more additional grooves arranged for telescopically receiving and/or displacing one or more additional elongated structural element, respectively. Said one or more additional grooves may e.g. be arranged at different locations of the housing, preferably parallel with the first and/or second grooves. In one embodiment the housing defines four grooves, arranged in pairs, i.e. two above each other on each of the two outer sides of the housing, but the housing may in principal define any number of grooves, e.g. three, four, five, six, eight, etc. each arranged for telescopically receiving and/or displacing an elongated structural element.

The present invention also relates to a structural frame comprising at least one corner assembly according to the invention. It is however preferred that the structural frame comprises four corner assemblies according to the invention each having a predetermined right angle, thereby providing a structural frame in the form of a equilateral square or a rectangle.

In order for said structural frame to function as e.g. an interim window, an interim door, a safety rail, and/or an interim partition, a pane is preferred inserted into said frame. In a preferred embodiment according to the invention this is obtained by utilizing elongated structural elements comprising a channel/opening arranged for displaceably receiving an area of the pane therein. In a preferred embodiment the elongated structural elements comprises more than one channel arranged parallel with each other, each arranged for received an area of a pane. For instance if the elongated structural element comprises two channels, the elongated structural element may contain two parallel panes, etc.

Each channel/opening preferably has a cross-sectional height perpendicular to its length, which substantially corresponds to the thickness of the pane, such that said pane is guided in and securely held by the channel. Each channel may e.g. form a U, seen in cross section.

The channel preferably has a depth, perpendicular to its length, which is larger than the length of the adjacent groove, thereby that ensuring irrespectively of the telescopically extension of the elongated structural element, a part of the pane will remain in the channel. For instance, if the provided structural frame is intended to be used as an interim window, the two grooves of each corner assembly may e.g. each have a length of 10 cm, and the channel in each elongated structural element may have a depth of 15 cm, such that when a pane is inserted into said channel, it is possible to provide a sufficient overlap between pane and elongated structural element, thereby ensuring that at least a certain portion of the pane remains in the channel during telescopic displacement of the elongated structural element in the corner assemblies.

The elongated structural elements are in a preferred embodiment made as an substantially flat integral component, wherein the guide profile is placed at one longitudinal edge, and the opening to the groove is placed at the other longitudinal edge.

The pane is, as far as possible, placed in the middle of the frame and is fixed in this position by a suitable attachment means, arranged for attaching the pane in a desired position. Said attachment means may in a preferred embodiment comprise a telescope bracket, which is firmly secured to the pane at one end, e.g. using a nut/bolt combination, and at the other end being arranged for releasably engaging the elongated structural element.

The pane is preferably made of a solid material, e.g. Plexiglas, glass, wood, metal etc., and may be selected depending on the intended use of the structural frame. For instance a solid pane of glass or Plexiglas may be useful for an interim window, whereas an interim door or interim partition may have a solid pane of wood. Using a solid pane both has the advantage that it will provide good insulation properties, and a good security against the intrusion of unauthorized persons, as the solid pane cannot easily be broken or cut open in the same way as panes consisting of a flexible plastic sheet. In an alternative embodiment the pane may be in the form of a net e.g. made of metal. This is e.g. an advantage if the structural frame is being used as a safety rail, a fence or similar construction in which it may be preferred to allow e.g. air and water to pass through the pane.

In order to mount the structural frame, e.g. interim closure in a wall opening or to a surface, the corner assembly may further comprise one or more mounting brackets arranged for fixing the closure in said opening. Said mounting brackets may in a preferred embodiment be releasably attached to the outer surface of the first corner module, e.g. in a recess, and may comprise one or more openings for fastening the interim closure to the wall or surface etc. e.g. using screws or the like. The mounting bracket may preferably be constructed complementary to engagement surfaces the of elongated structural element and/or housing e.g. such that said mounting bracket is arranged for engaging one or more grooves, recesses etc. formed in the structural element and/or housing. In this way the user can easily mount the bracket at any desired location of the structural frame. The user only has to detach the mounting bracket from the corner assembly, attach it to the elongated structural element and/or the housing at the desired location, and fasten it to the wall/surface.

The structural elongated element and/or the components of the corner assembly can be made of any hard and durable material e.g. metal. It is however preferred that said components are made of a light and inexpensive material e.g. of a suitable plastic materiel, such as a thermoplastic polymer or composite. In a preferred embodiment the components are made of material comprising polyamide, e.g. aliphatic polyamides such as nylon PA6 and PA6/6, as these materials maintains high thermal and mechanical properties in combination with good toughness and processability. Suitable commercially polymers are available as Akulon®, manufactured by DSM Engineering Plastics.

The invention also relates to a method of adjusting the dimensions of a structural frame or an interim closure comprising one or more corner assemblies according to the invention, wherein said method comprises
 a. placing the first and/or second locking mechanism of at least one corner assembly in a released position,
 b. placing the first and/or second elongated structural element in a desired position relative to the corner assembly by displacing said elongated structural element in its corresponding groove,
 c. actuating the first and/or second locking mechanism to a clamped position, where the elongated structural element is secured to the corner assembly by frictional force, and
optionally repeating one or more of the above steps.

In a preferred embodiment the structural frame, comprises four corner assemblies according to the invention and four elongated structural elements.

BRIEF DESCRIPTION OF THE DRAWINGS

The invention will be explained in greater detail below, describing only exemplary embodiments with reference to the drawing, in which FIGS. 4a and 4b shows the function of the toggle clamps shown in FIG. 1, FIGS. 5a and 5b. shows an enlarge view of the toggle clamp of FIG. 4 in a released and activated position, FIG. 6 is an exploded view of the corner assembly of FIG. 1.

DETAILED DESCRIPTION

The invention will be described below with the assumption that the corner assembly has a predetermined angle of 90 degrees. However, this assumption is not to be construed as limiting, and the corner assembly could just as easily have an acute or a blunt angle.

Figure 1:
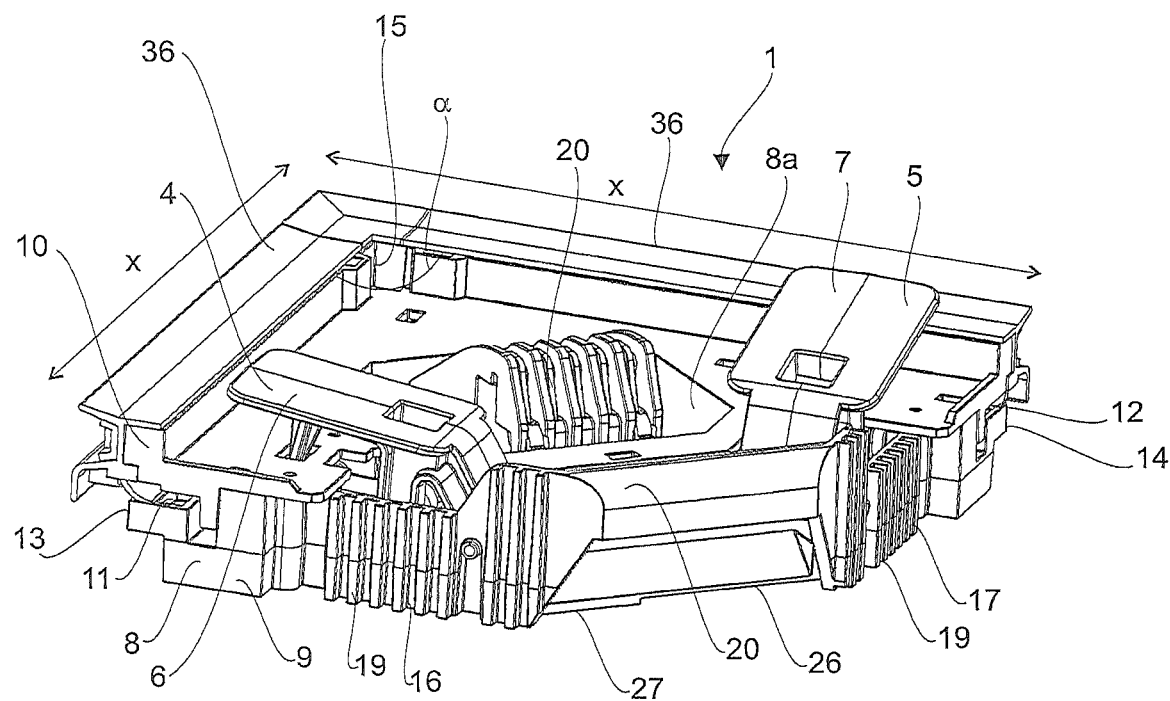
FIG. 1 is a schematic view of a first embodiment of a corner assembly according to the invention.
Figure 2:
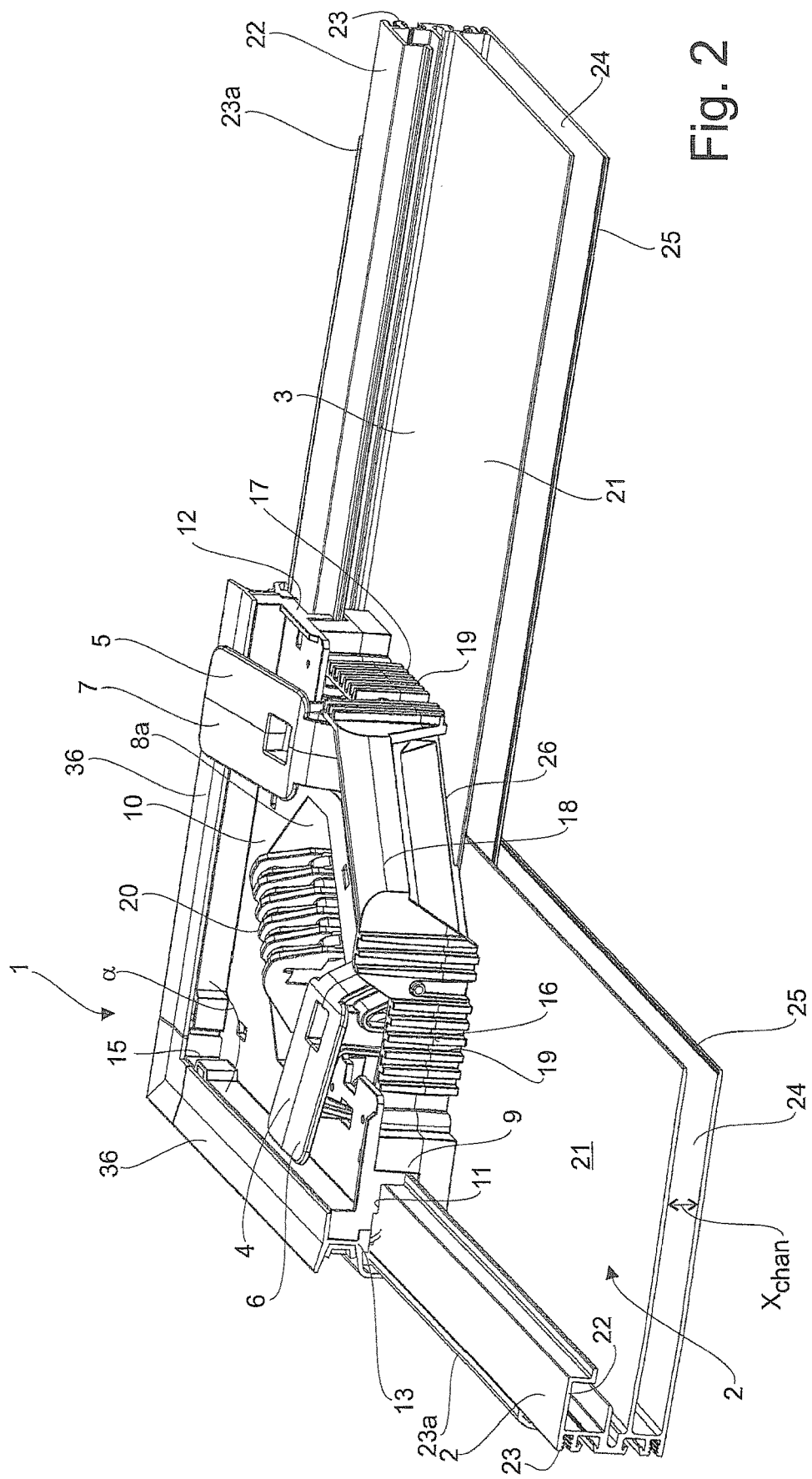
FIG. 2 shows the corner assembly of FIG. 1 with a first and a second elongated structural element releasably fastened thereto.

FIG. 1 shows a schematic representation of a corner assembly 1 according to the principles of the present invention, and FIG. 2 shows the same with a first and a second elongated structural element 2,3 releasably fastened thereto, by means of a first and a second locking mechanisms 4,5 in the form of a first and second toggle clamp 6,7 (first toggle clamp assembly).

The corner assembly comprises a housing 8 having a first and a second corner module 9,10 arranged for being releasably interconnected to each other, thereby defining a first and a second groove 11,12 extended from a first and second outer side of the housing 13,14. Each groove 11, 12 are adapted for telescopically receiving an end of a first and/or second elongated structural element 2,3.

The corner assembly 1 may have any suitable shape, however in the embodiment shown the corner assembly is in the form of a substantially flat pentagon, and wherein the first and second outer sides 13,14 each has a length X which substantially corresponds to the length of the corresponding groove. Said first and second grooves 11, 12, and accordingly the first and second outer sides 13,14 meets in a corner 15 having a predetermine right angle α, i.e. of 90 degrees.

The corner assembly further defines two front sides 16, 17 arranged perpendicular to the first and second outer sides 13,14 respectively. Said front sides 16,17 meets in a handle 18, arranged opposite the corner 15, and is in the embodiment shown arranged at a blunt angle to said front sides, thereby ensuring that the handle 18 can be used for easy manipulation of an assembled structural frame. In order to provide a lightweight construction with a high integrity, a number of reinforcements ribs 19 are placed on the front sides 16,17, and the handle 18.

In the embodiment shown, the corner assembly 1 further comprises a releasable mounting bracket 20 placed in a middle recess 8a of the housing 8. Said bracket can be removed from the corner assembly and thereafter used for attaching the structural frame to e.g. a wall section. However, a person skilled in the art will understand that such a bracket is not needed for all structural frames, e.g. for interim doors, which may be placed in an opening via suitable hinges.

As shown in FIG. 2, each elongated structural element 2,3 is defined by two opposite and parallel longitudinal mounting plates 21, having a guide profile 22 at a first elongated side 23, and a channel 24, for receiving an area of a solid pane, extending from the opposite second elongated side 25. The spacing between the two mounting plates defines the channel 24, which preferably has a thickness $K_{chan}$ which mainly corresponds to the thickness of the pane (not shown). A gasket 23a is placed at the first elongated end of the elongated structural element for providing a tight seal when placed in e.g. a door or window opening.

Figure 3:
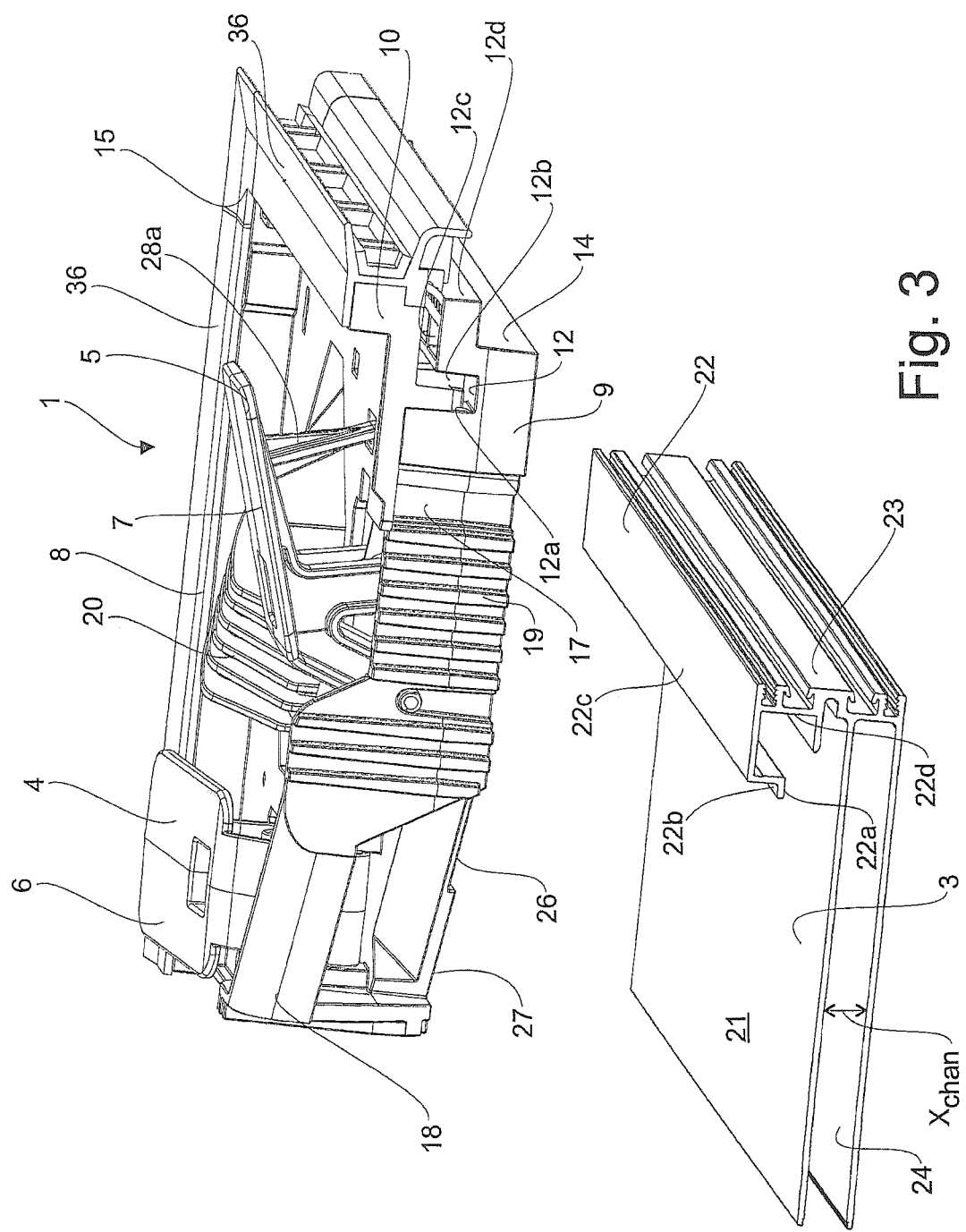
FIG. 3 shows an elongated structural element and the corner assembly of FIG. 1 before being connected.

FIG. 3 shows the second elongated structural element 3 and the corner assembly 1 before the second elongated structural element 3 is inserted in the second groove 12. The cross sectional shape of the guide profile 22, perpendicular to its length comprises four legs 22a,22b,22c,22d arranged at an angle of about 90 degrees to each other, thereby providing a cross sectional shape complementary to corresponding sections 12a,12b,12c,12d of the corresponding groove 12. This ensures that the movement of the elongated structural element 3 is both effectively guided during the telescopic displacement in the groove 12, and that the elongated structural element 3 only can be inserted in the groove 12 in one way, thereby preventing an incorrect assembling of the structural frame.

As shown in FIG. 2 the first and second elongated structural elements 2,3 overlaps under the corner assembly, when they are placed in each their groove 11,12. In order to ensure a tight and stable fit between the structural elements 2,3 and the corner assembly, a section 26 of the bottom surface 27 of the second corner module is recessed. In the embodiment shown the respective section 26 corresponds to the area the second structural element 3 will occupy under the corner assembly 1.

The toggle clamps comprises a toggle handle 28 and a toggle mechanism 29. As shown in FIGS. 1, 2 and 3 the toggle handle 28 extends above the first corner module 9 for easy manipulation and activation, and the toggle mechanism 29 is placed inside the housing 9. However, in FIGS. 4a and 4b, the first corner module 9 has been removed showing the function of the toggle clamps, wherein the first toggle clamp 6 is shown in the activated position and the second toggle clamp 7 in the released position. The first and second toggle clamp 6,7 is shown in larger view in FIGS. 5a and 5b respectively.

Figure 4A:
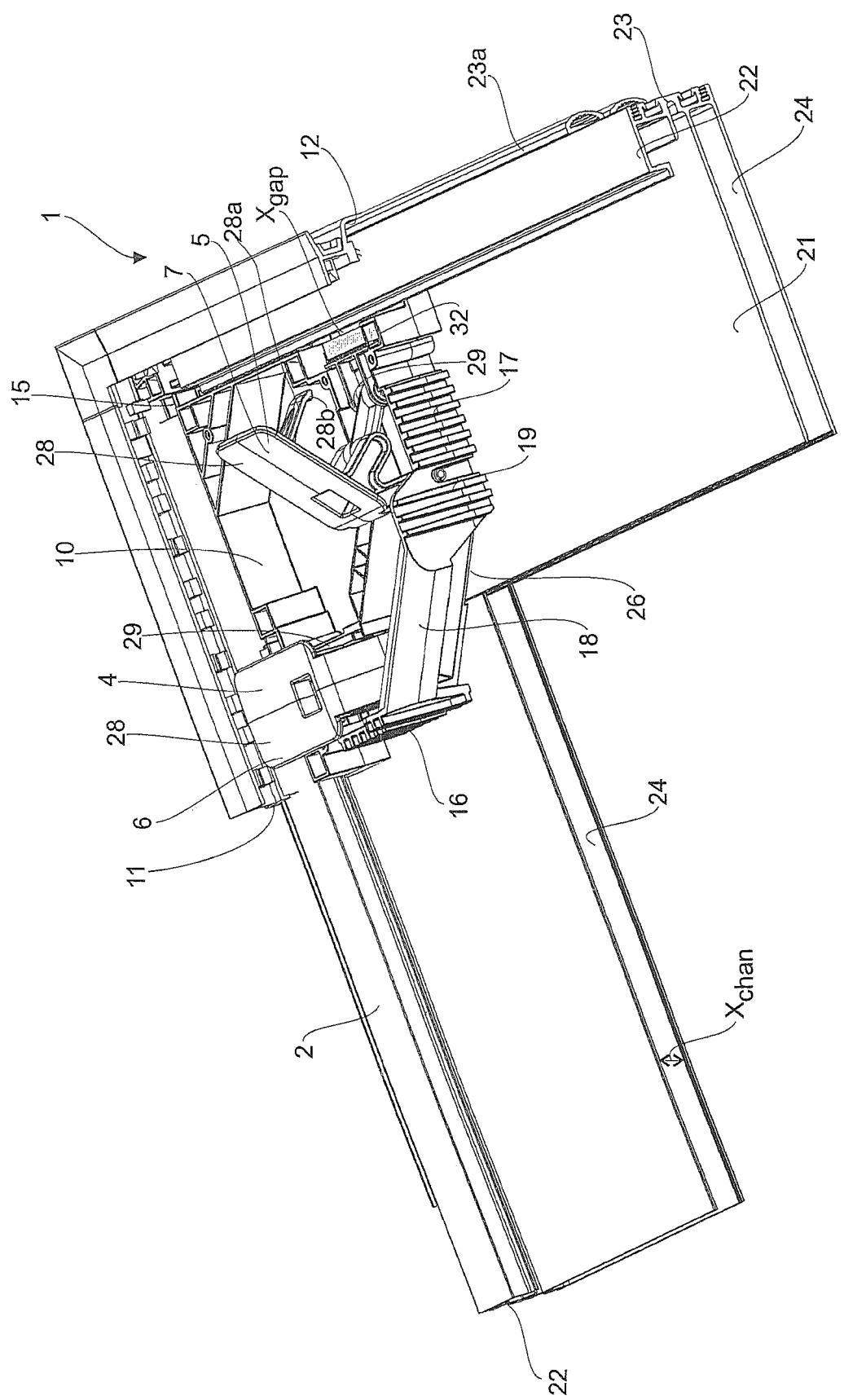
Figure 5A:
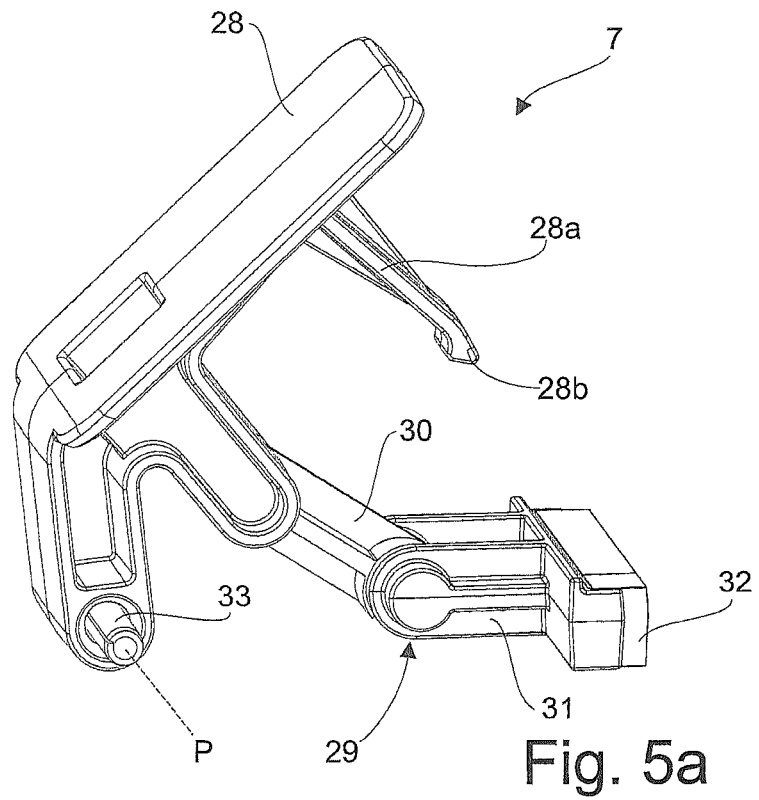
Figure 5B:
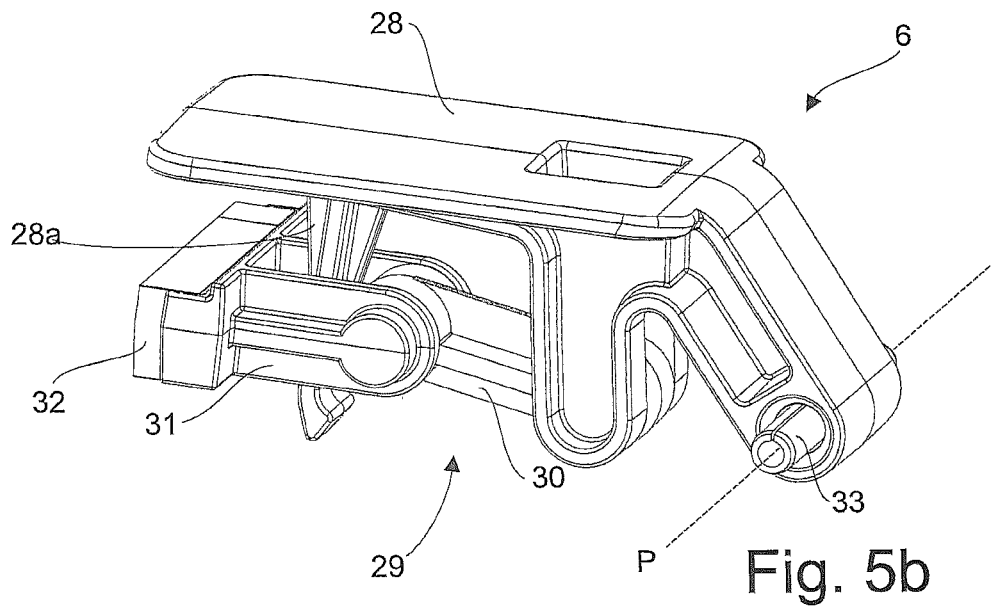

As is best seen in FIGS. 5a and 5b, each toggle clamp comprises a toggle handle 28 for actuating a toggle mechanism 29 between a released position, seen in FIG. 4a, where the elongated structural element 3 can be displaced in the groove 12 of the housing 8; and an actuated position, seen in FIG. 4b, where the elongated structural element 2 is fixed to the corner assembly 1 by frictional force. The toggle mechanism 29 comprises a toggle knee 30, and a toggle bumper 31, having an elongated abutment surface 32.

Each toggle handle 28 is arranged for pivoting between the clamped and the released position about a pivot axel 33 placed in a recess in a lower part of the second corner module 10, such that the user only has to lift and or press the toggle handle 28 in order to shift between the clamped and the released position.

When the toggle handle is placed in the released position as seen in FIGS. 4a, and 5a, the toggle knee 30 moves the toggle bumper 31 backwards in order to provide a small gap $X_{gap}$ between the guide profile 22 and the elongated abutment surface 32, allowing the second elongated structural element 3 to be displaced in the second groove 12.

When the toggle handle 48 is pressed down, as best seen in FIGS. 4b and 5b, placing the toggle clamp 6 in an actuated position, the toggle knee 30 will move the toggle bumper 31 forward in order to press the elongated abutment surface 32 resiliently against a part of the elongated structural element 2 placed in the groove 11, thereby fastening/securing the elongated structural element 2 to the corner assembly 1.

The toggle clamp further comprise a locking unit 28a with a locking hook 28b arranged for locking said toggle clamp in a clamped position to prevent unintentional movement of the toggle clamp when the toggle clamp is in a closed, clamped position. The looking hook 28b is arranged for releasably engaging a recess in the housing (not shown), and wherein said hook is arranged for being disengaged from said recess if pressure is applied to lift the toggle handle when the toggle clamp is moved to the released position.

The construction of the toggle clamp will not only allow the toggle clamp 6,7 to be operated without the need of any tools, but also that any construction e.g. a structural frame using one or more the corner assemblies 1 according to the invention, easily can be assembled, adjusted, and or dismantled simply by moving the toggle handle 48 between the released and actuated position.

In order to providing a firm and secure connection between the elongated abutment surface 32 and the elongated structural element 2,3, the elongated abutment surface 32 is in the embodiment shown made of a resilient, slightly deformable material arranged for providing a firm grip with a high friction coefficient whereby an improved and stable corner assembly 1 according to the invention is provided, wherein fixation of the elongated structural elements 2,3 in the respective grooves 11,12 is achieved only by frictional force and not by use of e.g. screws/bolts etc.

An exploded view of the corner assembly 1 is shown in FIG. 6, and as can be seen the first and second module 9,10 of the housing 8 comprise a number of complementary mating surfaces 34a,34b,34c which fit together to form the overall housing 8. Said mating surfaces 34a is on the first module 9 placed on both the outer section 34c and an inner middle section 35, corresponding to the inner recess 8a, and on one or more opposite edges 36 and interior surface 37 of the second module 10. In the embodiment shown the mating surfaces 34 are configured to exactly match, such that the first module 9 will be guided towards the second module 10 by the geometry of the respective mating surfaces 34, during assembling, thereby providing a simple and reliable way of assembling the housing 8.

In order to ensure that the first and second corner modules 9,10 stays firmly connected after assembly, the lower surface 38 of the first corner module 9 comprises a number of integral barbed fastening pins 39 arranged for being releasably received in complementary slots 40 on the mating surface 34 of the second module 10.

The fastening pin 39 is slightly angled to allow the barb to disengage from the slot 40 if pressure is applied to said barb, allowing the first and second corner module 9,10 to be disconnected if desired. The releasable mounting bracket 20 is placed in the inner recess 8a of the housing 8, via a clip 41, and comprises a number of holes (not shown) for allowing the structural frame to be attached to a wall or in an opening e.g. using screws/bolts etc. after it has been detached from the corner assembly. The mounting bracket may preferably be arranged for engaging one or more grooves, recesses etc. formed in the first elongated side 23 of the elongated structural element 2,3, and/or in the first and second outer side of the housing 13,14. It is further preferred that said bracket is arranged for sliding along the engaged groove/recess, thereby allowing a simply and easy ways of both attaching the structural element to e.g. a wall and adjusting the position of the mounting bracket in relation to the structural frame.

On each outer edge 41 of the first module 9 an edge gasket 42 is provided, such that when a structural frame with the corner assembly 1 according to the invention is inserted into an opening in e.g. a wall, a substantially air and/or liquid tight seal is provided between the wall and the structural frame. Each gasket 42 is releasable attach to the edge 41 by means of a mounting profile 43, having a number of projections 44 matching a number of openings 45 in the gasket 42 and a number of recesses 46 in the edge 41, such that when the gasket 42 is aligned with the edge 41, the projections 44 of the mounting profile 43 extends through the openings 45 of the gasket and interlocking with the recesses 40 in the edge of the first module 9, thereby releasable attached the gasket 42 to the first module 9.

The two edge gaskets 42 are combined at the corner 15 via a separate corner gasket 47, arranged for being interconnected with the two edge gaskets 42 via two extensions 48, each having an opening 49 for being attached to the respective edges 41 via the projections 44 of the mounting profile 43. In order to further protect the corner from outside damages and wear/tear, a corner block 50 is placed at the corner 15, and is e.g. connected to the other components via a bolt/nut.

The edge gaskets 42 may have any desired cross-sectional shape, however in the embodiment shown, the edge gasket 42 comprises two upper flaps 51 and an outer lower flap 52, all arranged for providing an outer sealing, and an inner lower flap 53, abutting a surface in the groove 11,12 in order to provide a seal with the guide profile 22. Said edge and corner gaskets 42,47 will thereby effectively ensure that water/air cannot enter into the interior of the housing 8, and that a liquid tight seal is providing when the structural frame is inserted in an opening.

Figure 7:
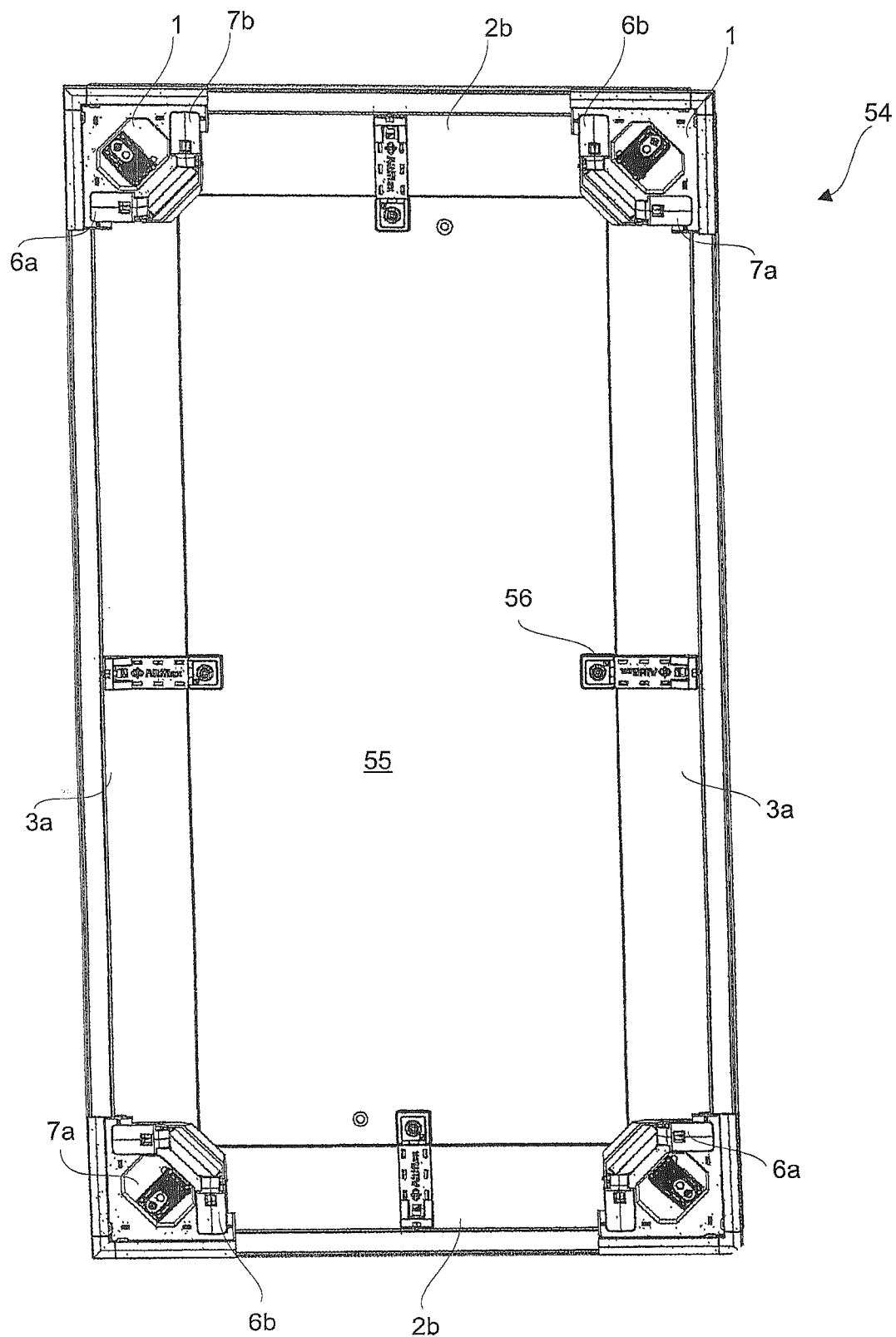
FIG. 7 shows a structural incorporating the corner assembly shown in FIG. 1.

FIG. 7 shows a rectangular structural frame 54 according to the invention in which four corner assemblies 1 shown in e.g. FIG. 1 are connected via four elongated structural elements 2, 3, such that two corner assemblies is connected via one elongated element.

In FIG. 7 a solid pane 55, of e.g. glass, plastic or wood, has been inserted into the structural frame 54. The resulting vertical structural frame can be used as an interim window or an interim door arranged for sealing a building during construction or renovation, or as an interim wall/partitions arranged for preventing dust from spreading during construction and/or renovation work, and the like. If the construction is intended to be used as a door, the construction may comprise hinges mounted on one side of the construction, allowing the door to be pivotally fastened in the doorframe.

The solid pane is inserted in the frame via the channels 24 of the respective elongated structural element 2, 3. Said channels are arranged to displaceably receive an area of the solid pane 55 therein, and have a thickness $X_{chan}$ which substantially corresponds to the thickness of the pane $X_{pane}$, such that said pane easily can slide in the channel but also be guided in the channel, whereby any undesired sideways slack is prevented.

The solid pane is placed in the middle of the frame 54 and is fixed in this position by a suitable attachment means 56, arranged for attaching the pane in a desired position. Said attachment means may in a preferred embodiment comprise a telescope mounting, which is firmly secured to the pane at one end, e.g. using a nut/bolt combination, and at the other end being arranged for engaging releasably the elongated structural element The structural frame 54 can be adjusted in width by releasing the toggle clamps 6b,7b holding the first (short) elongated structural elements 2b, and displacing said elements lengthwise in their respective grooves, and then activating the toggle clamps by pressing down on the toggle handle 28. The structural frame can further be adjusted in height by releasing the other clamping nuts 6a,7a holding the second (long) elongated structural element 3a, thereafter displacing the elongated structural elements 3a in their respective grooves, and then fixing the elements by activating the toggle clamps once the desired position is obtained. It is also possible to adjust the height/width by only disengaging the two elongated structural elements at one end, e.g. if only a small adjustment is needed.

Since the toggle clamps 6,7 are arranged for individually securing/fastening the elongated structural element 2,3 to the respective corner assemblies, the height and/or width of the frame can be individually and independently adjusted by simply adjusting the telescopic extension of the respective elongated elements, and via the individual toggle clamps 6,7 secure them at the desired extension to the respective corner assembly 1, thereby providing a very high degree of flexibility.

This is advantageously, since the structural frame, e.g. an interim closure can be assembled at one location, and then easily and individually adjusted to the desired size on site, e.g. in order to correspond to structural openings of different dimensions and tolerances. It is thereby possible to provide a structural frame which matches/fits each and every opening, even though there may be variations between the respective openings. Furthermore, when e.g. a window opening later is closed by a permanent window, the interim window can easily be adjusted to fit a different opening having a different size. The structural frame can accordingly be used several times.

Figure 8:
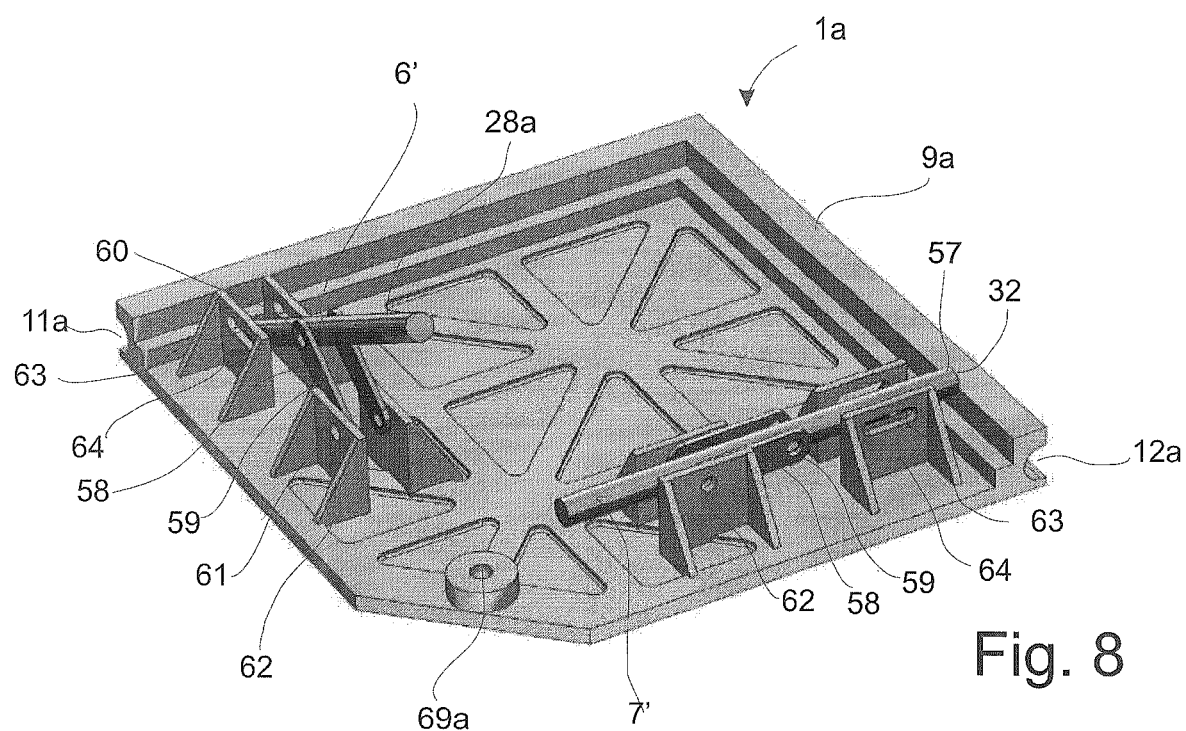
FIG. 8 shows schematically a second embodiment of a corner assembly according to the invention.

FIG. 8 shows second embodiment of a corner assembly according to the present invention. Said corner assembly can be used in an identical manner to the corner assembly shown in FIGS. 1-7, but comprises an alternative toggle clamp 6',7'. In order to show the function of the toggle clamps 6',7', only the first corner module 9a of the housing 8a is shown in FIG. 8, where the first toggle clamp 6' is shown in the released position and the second toggle clamp 7' in the activated clamped position.

The housing 8a of FIG. 8 differs slightly from the housing shown in FIGS. 1-7, but the overall function is the same and for like parts the same references numbers are used. As an example can be mentioned that the first corner module 9a also comprises a first and a second groove 11a,12a, each being an adapted for telescopically receiving an end of a first and/or second elongated structural element 2,3 (not shown).

Each toggle clamp 6',7' comprises a toggle handle 28a that will pivot between the released position, where the elongated structural element (not shown) can be displaced in the groove 11a,12a of the housing; and an actuated position, where the elongated structural element is fixed to the corner assembly 1a by frictional force via an abutment surface 32a placed at the distal end 57 of the toggle handle. The abutment surface 32a may preferably comprise a resilient, slightly deformable material arranged for providing a firm grip with a high friction coefficient with the elongated structural element 2,3.

The relative pivotal movement between the released and actuated position is provided by a hinge 58 comprising two guide plates 59 which at one end 60 is connected to a middle section of the toggle handle 28a and at the other end 61 to each their mounting unit 62. The length of the guide plates will limit the relative pivotal movement between the released and actuated position.

The movement is furthermore guided/restricted by two sliding pins (not shown) placed near the distal end 57 the toggle handle 28a each being arranged for engaging a sliding opening 63 in respective sliding blocks 64.

An opening 69a arranged for engaging e.g. a wing not is placed in the housing for allowing an easy attaching of a pane in a desired position in a structural frame comprising one or more corner assemblies according to the preset invention. Said opening could be omitted as the pane also could also be connected to the structural frame as described in relation to FIG. 6.

Figure 9:
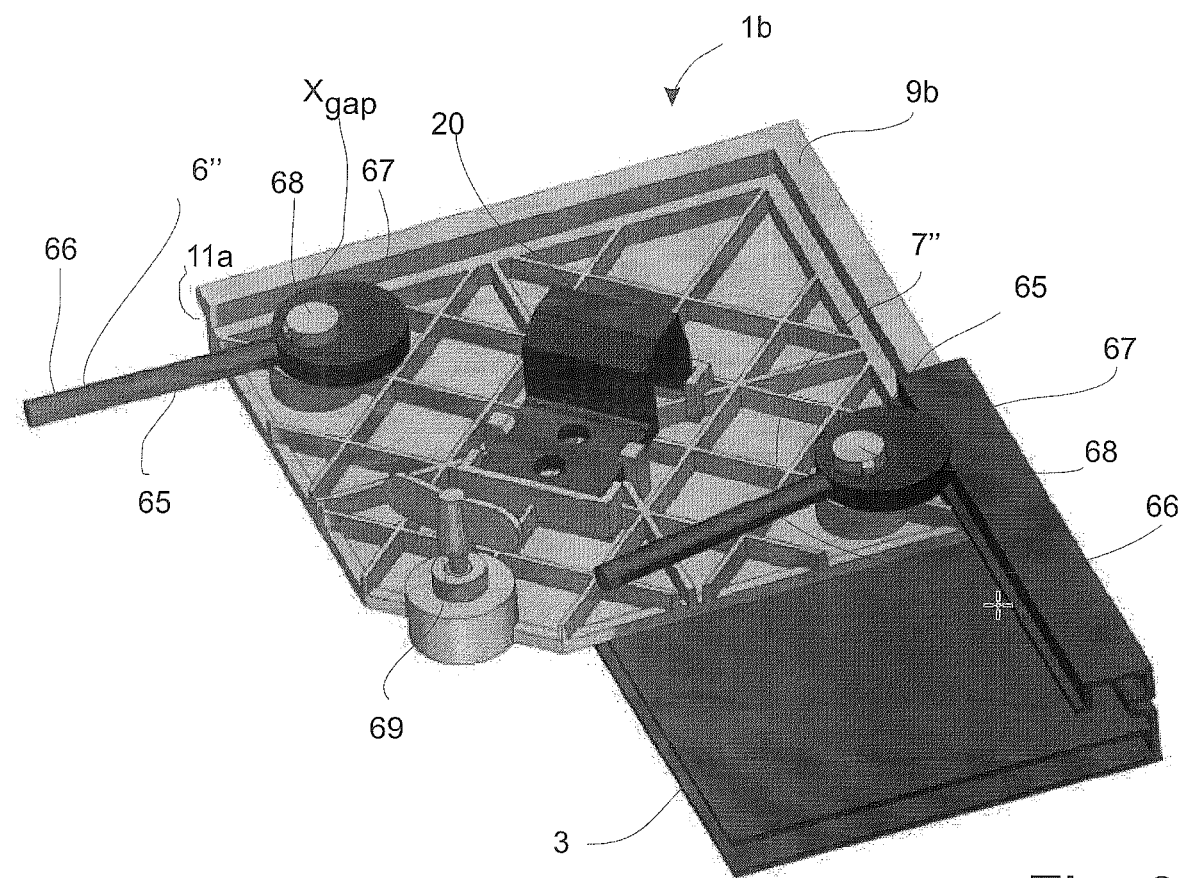
FIG. 9 shows schematically a third embodiment of a corner assembly according to the invention.

FIG. 9 shows a third embodiment corner assembly comprising an alternative locking mechanism according to the present invention. The third embodiment can be used in an identical manner to the corner assembly shown in FIGS. 1-8, and for like parts the same references numbers are used. Said corner assembly comprises an alternative locking mechanism 6",7". Only the first corner module 9b is shown in FIG. 9 wherein the first locking mechanism 6" is shown in the released position and the second locking mechanism 7" in the activated position.

The locking mechanisms 6",7", are in the form of a swing unit 65 comprising a swing arm 66 connected to a circular abutment unit 67 made of resilient, slightly deformable material. The swing arm may rotate about 90 degrees about a rotating axis 68, providing a the small gap $X_{gap}$ between the elongated structural element and the circular abutment unit 67 when the locking mechanism is in the released position, thereby allowing the elongated structural element to be displaced in the corresponding groove, and providing a firm grip with the elongated structural element when the locking mechanism is placed in an actuated position.

A wing nut 69 is placed in the opening 69a of the housing for allowing an easy attaching of a pane in a desired position in a structural frame comprising one or more corner assemblies according to the present invention, but could be omitted as discussed for FIG. 8. A mounting bracket 20 is placed in the inner recess 8a of the housing 8, in a similar manner as discussed for FIG. 6.

Figure 10:
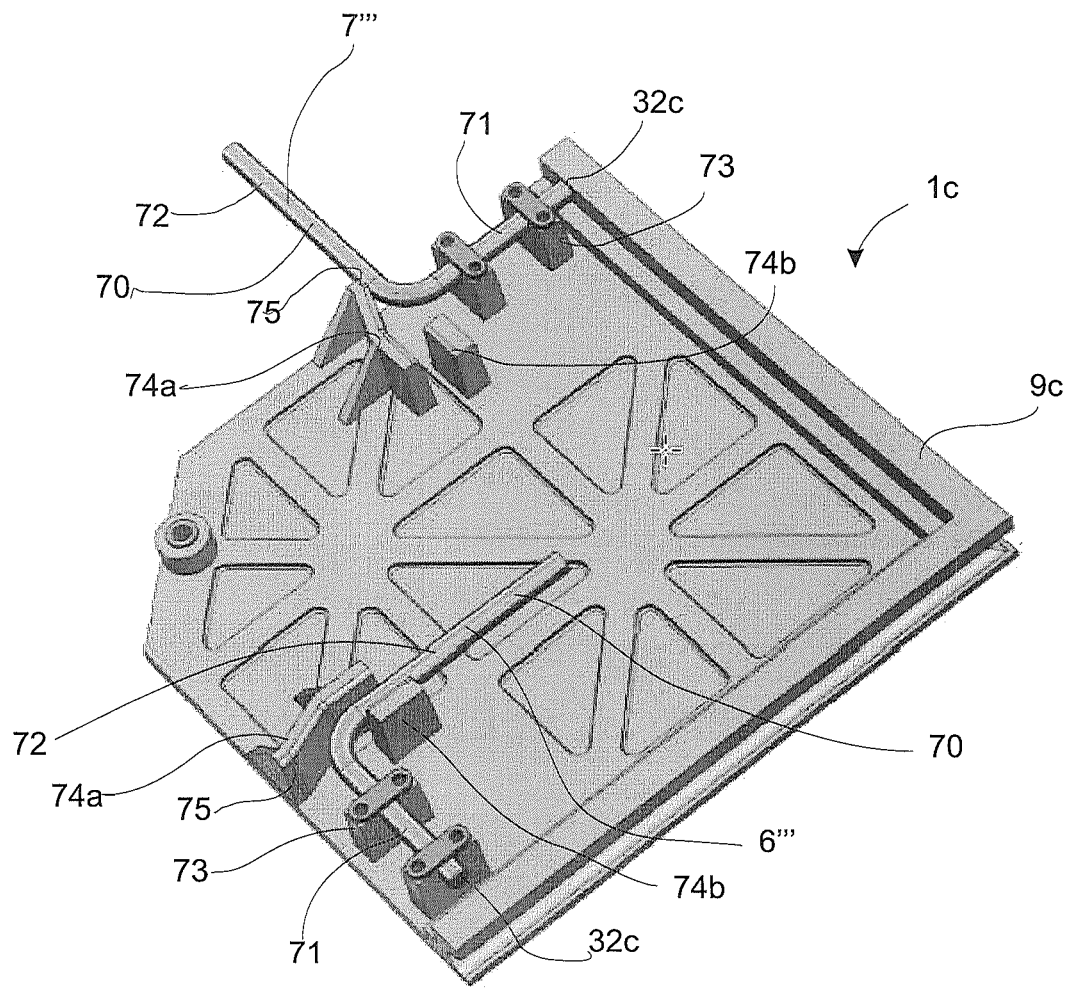
FIG. 10 shows schematically a fourth embodiment of a corner assembly according to the invention.

FIG. 10 shows a fourth embodiment of a corner assembly 1c comprising an alternative locking mechanism according to the present invention. The fourth embodiment can be used in an identical manner to the corner assembly shown in FIGS. 1-9, and for like parts the same references numbers are used. The corner assembly 1c comprises a locking mechanism 6''', 7''' in the form of an L-shaped pin 70, and wherein the first L-shaped pin 6''' is shown in the released position and the second L-shaped pin 7''' in the activated position.

The L-shaped pin 70 comprising a first leg 71 with an abutment surface 32c for engaging the elongated structural element (not shown), and second leg 72 that is functioning as a handle.

The first leg 71 is connected to the housing via two connection units 73 which has sufficient clearance for allowing the L-shaped pin to both rotate about the first legs longitudinal axis, and move along said longitudinal axis. This will in a simple manner both guide and allow the L-shaped pin 70 to swing/pivot between the released and activated position.

When the L-shaped pin 70 is in the released position said pin is placed in a plane parallel with the housing, and the second leg 72 of the L-shaped pin is placed between two parallel locking plates 74a,74b in order to prevent any unintentional movement of the L-shaped pin 70 e.g. during transport. When the L-shaped pin 70 is to be placed in the activated position, the used simply swings the L-shaped pin out of the plane parallel with the first corner module 9c, move the first leg 71 towards the elongated structural element, in order to abut said element, and continue the swinging movement until the L-shaped pin 70 again is placed in a plane parallel with the first corner module 9c. The L-shaped pin 70 is then secured to the first corner module 9c, e.g. by abutting the second leg 72 against a first abutment surface 75 of the first connection unit 74a, thereby preventing any unintentional movements of the pin.

The construction of the locking mechanism described herein can all be operated without the need of any tools, thereby ensuring that any construction e.g. a structural frame using one or more the corner assemblies 1 according to the invention, easily can be assembled, adjusted, and or dismantled simply by moving the locking mechanism between the released and actuated position.

Modifications and combinations of the above principles and designs are foreseen within the scope of present invention.

The invention claimed is:

1. A corner assembly for use in a structural frame, said corner assembly comprises a housing defining a first and a second groove arranged at a predetermined angle (α) to each other, and wherein the first groove is arranged for telescopically receiving and/or displacing a first elongated structural element and the second groove is arranged for telescopically receiving and/or displacing a second elongated structural element, and wherein the corner assembly further comprises a first and a second locking mechanisms arranged for independently of each other releasably fastening the first and second elongated structural element in the corresponding first and second groove, and wherein the telescopic extension/displacement of one elongated structural element of the first and second elongated structural elements is individually and independently adjusted irrespectively of the extension/displacement of the other elongated structural element of the first and second elongated structural elements; wherein
  the corner assembly comprises one or more mounting bracket(s) arranged for fixing said corner assembly to a structure or in a structural opening.

2. The corner assembly according to claim 1, wherein each first and second locking mechanism comprises a toggle clamp assembly, said toggle clamp assembly comprises a toggle handle for actuating a toggle mechanism between a clamped position, where the respective first and second elongated structural element is secured to the corner assembly by frictional force, and a released position, where the respective elongated structural element can be displaced in the corresponding first and second groove of the housing.

3. The corner assembly according to claim 2, wherein the toggle handle is arranged for pivoting between the clamped and the released position about a pivot axel.

4. The corner assembly according to claim 2, wherein each toggle clamp assembly is arranged for transferring a predetermined tension load to the first and second elongated structural elements in the clamped position, and wherein said predetermined tension load is higher than the external forces acting on the first and second elongated structural elements.

5. The corner assembly according to claim 2, wherein each toggle clamp assembly comprises an abutment surface arranged for being pressed against at least a part of the first and second elongated structural elements when the toggle mechanism is placed in the clamped position.

6. The corner assembly according to claim 5, wherein the abutment surface is elongated and consist of, or comprises an outer layer of, a resilient and/or deformable material arranged for increasing the friction coefficient and/or the surface area contact between the abutment surface and the elongated structural element.

7. The corner assembly according to claim 1, wherein the predetermined angle (a) is a right angle.

8. The corner assembly according to claim 1, wherein the first and second groove have substantially identical lengths/dimensions.

9. The corner assembly according to claim 1, wherein the housing of the corner assembly comprises a first and a second corner module arranged for being releasably interconnected to each other thereby defining the first and second groove for telescopically receiving and displacing the first and second elongated structural element respectively.

10. The corner assembly according to claim 1, wherein the first and second groove have a shape which is complementary to a guide profile of the first and second elongated structural element respectively.

11. The corner assembly according to claim 1, wherein the cross sectional shape of each first and second groove, perpendicular to its respective length has an L-shape, a zigzag shape, and/or comprises a number of legs.

12. The corner assembly according to claim 9, wherein the first and second corner module of the housing comprises complementary mating surfaces with a shape and geometry configured to exactly match, or at least substantially match to each other.

13. The corner assembly according to claim 9, wherein the first and second corner module comprise a number of snap fits, and/or other complementary structural fastening mechanisms arranged for interlocking the modules together.

14. The corner assembly according to claim 1, wherein the corner assembly comprises one or more gasket(s).

15. The corner assembly according to claim 14, wherein said one or more gasket(s) are releasable attach to said edge(s) by means of a mounting profile.

16. A structural frame comprising at least one corner assembly according to claim 1.

17. The structural frame in the form of an equilateral square or a rectangle, said structural frame comprises four corner assemblies according to claim 1, and four elongated structural elements.

18. The structural frame according to claim 16, wherein a pane is inserted into said structural frame.

19. The structural frame according to claim 18, wherein each elongated structural element of the structural frame comprises a channel arranged for displaceably receiving an area of the pane therein.

20. The structural frame according to claim 19, wherein each elongated structural element is a substantially flat component having at one longitudinal side a guide profile arranged for engaging the first or second groove of the housing, and wherein the channel extends from the opposite longitudinal side.

21. The structural frame according to claim 19, wherein the channel of the elongated structural element has a cross-sectional height/thickness perpendicular to its length, which substantially corresponds to the thickness of the pane.

22. The structural frame according to claim 19, wherein the channel of the elongated structural element has a depth, perpendicular to its length, which is larger than the length of an adjacent groove of the first and second grooves.

23. A method of adjusting the dimensions of the structural frame according to claim 16, wherein said method comprises:
   a. providing a corner assembly according to claim 1,
   b. placing the first and/or second locking mechanism of at least one corner assembly in a released position,
   c. placing a first and/or second elongated structural element in a desired position relative to the corner assembly by displacing said elongated structural element in its corresponding groove,
   d. actuating the first and/or second locking mechanism to a clamped position, where the elongated structural element is secured to the corner assembly by frictional force, and
   e. optionally repeating one or more of the above steps.

24. An interim window, an interim door, a partition, and/or a safety rail comprising the structural frame according to claim 16.

* * * * *